United States Patent
Scott et al.

(10) Patent No.: US 10,832,826 B2
(45) Date of Patent: Nov. 10, 2020

(54) INSPECTION OF NUCLEAR WASTE

(71) Applicant: United Kingdom Research and Innovation, Swindon (GB)

(72) Inventors: Thomas Scott, Bristol (GB); Ceri Mae Brenner, Reading (GB); Richard Allott, Wantage (GB)

(73) Assignee: United Kingdom Research and Innovation, Swindon (GB)

(*) Notice: Subject to any disclaimer, the term of this patent is extended or adjusted under 35 U.S.C. 154(b) by 124 days.

(21) Appl. No.: 15/774,190

(22) PCT Filed: Nov. 8, 2016

(86) PCT No.: PCT/GB2016/053488
§ 371 (c)(1),
(2) Date: May 7, 2018

(87) PCT Pub. No.: WO2017/081452
PCT Pub. Date: May 18, 2017

(65) Prior Publication Data
US 2018/0330839 A1 Nov. 15, 2018

(30) Foreign Application Priority Data
Nov. 9, 2015 (GB) .................................. 1519758.5

(51) Int. Cl.
*G01T 1/36* (2006.01)
*G21F 9/36* (2006.01)
(Continued)

(52) U.S. Cl.
CPC .............. *G21F 9/36* (2013.01); *G01N 23/046* (2013.01); *G21F 5/005* (2013.01); *G21F 9/04* (2013.01); *G21F 9/34* (2013.01); *H05G 2/00* (2013.01)

(58) Field of Classification Search
CPC ........ G01N 23/04; G01N 23/083; G01V 5/00; G01V 5/0033; G01V 5/0041; G01V 5/005; G01V 5/0091
See application file for complete search history.

(56) References Cited

U.S. PATENT DOCUMENTS 4,300,054 A 11/1981 Dance et al.
4,587,555 A 5/1986 Carollo et al.
(Continued)

FOREIGN PATENT DOCUMENTS

DE 2557092 A1 7/1977
EP 2149788 A1 2/2010
(Continued)

OTHER PUBLICATIONS

Davis et al. "Neutron production from 7Li(d,xn) nuclear fusion reactions driven by high-intensity laser-target interactions", Plasma Phys. Control. Fusion 52 (2010) p. 1-15 (Year: 2010).*
(Continued)

*Primary Examiner* — David P Porta
*Assistant Examiner* — Mamadou Faye
(74) *Attorney, Agent, or Firm* — Leydig, Voit & Mayer, Ltd.

(57) ABSTRACT

Methods and apparatus for inspecting nuclear waste, for example drums of intermediate level nuclear waste, are disclosed. In particular, a single laser pulse may be directed at a pitcher-catcher laser target structure, with subsequent separate detection of the generated X-rays and neutrons.

23 Claims, 8 Drawing Sheets

(51) Int. Cl.
  G01N 23/046 (2018.01)
  G21F 9/34 (2006.01)
  G21F 5/005 (2006.01)
  G21F 9/04 (2006.01)
  H05G 2/00 (2006.01)

(56) References Cited

U.S. PATENT DOCUMENTS

| | | | |
|---|---|---|---|
| 5,200,626 | A | 4/1993 | Schultz et al. |
| 5,519,225 | A | 5/1996 | Mohr et al. |
| 5,838,759 | A | 11/1998 | Armistead |
| 6,120,706 | A * | 9/2000 | Lessing ............... C01B 33/06 252/478 |
| 6,553,094 | B1 | 4/2003 | Bernardi et al. |
| 6,678,351 | B1 | 1/2004 | Perry et al. |
| 7,313,221 | B2 | 12/2007 | Sowerby et al. |
| 2005/0213710 | A1 | 9/2005 | Lawrence et al. |
| 2005/0220247 | A1 | 10/2005 | Ruddy et al. |
| 2010/0290587 | A1 * | 11/2010 | Umstadter ............ H05G 2/003 378/57 |
| 2012/0014491 | A1 * | 1/2012 | Deeth ................... G21B 3/008 376/103 |
| 2013/0264486 | A1 * | 10/2013 | Bingham .............. G01N 23/05 250/390.02 |
| 2014/0270034 | A1 * | 9/2014 | Clayton ............... G01V 5/0091 376/154 |

FOREIGN PATENT DOCUMENTS

| | | |
|---|---|---|
| JP | 63-187200 A | 8/1988 |
| JP | 11-64248 A | 3/1999 |
| JP | 2005-024539 A | 1/2005 |
| JP | 2008-256603 A | 10/2008 |
| WO | WO 2015/030619 A1 | 3/2015 |

OTHER PUBLICATIONS

Mimura et al. "Generation of 1020 Wcm-2hard X-ray laser pulses with two-stage reflective focus system", Nature Communications, Macmillan Publishers Limited., 2014, p. 1-5 (Year: 2014).*

Klir et al. "Efficient neutron production from sub-nanaosecond laser pulse accelerating deuterons on target front side", CrossMark, Physics of Plasmas 22, Sep. 2015 p. 093117-1-093117-11. (Year: 2015).*

Agostinelli et al., "GEANT4—a Simulation Toolkit," *Nuclear Instruments and Methods in Physics Research A*, 506: 250-303 (2003).

Agostinelli et al., "GEANT4—a Simulation Toolkit," FERMILAB-Pub-03/339, SLAC-PUB-9350, 86 pp. (Dec. 2003).

Cipiccia et al., "A Tuneable Ultra-Compact High-Power, Ultra-Short Pulsed, Bright Gamma-Ray Source Based on Bremsstrahlung Radiation From Laser-Plasma Accelerated Electrons," *J. of Applied Physics*, 111: 063302 (2012).

CLF Vulcan, "Vulcan is a petawatt laser system . . . ," 3 pp., downloaded from the Internet at http://www.clf.stfc.uk/CLF/Facilities/Vulcan/12248.aspx on Sep. 20, 2018.

Courtois et al., "High-Resolution Multi-MeV X-Ray Radiography Using Relativistic Laser-Solid Interaction," *Physics of Plasmas*, 18, 023101, 6 pp. (Feb. 2011).

Glinec et al., "High-Resolution γ-Ray Radiography Produced by a Laser-Plasma Driven Electron Source," *Physical Review Letters*, 94, 025003 (Jan. 21, 2005).

Hernandez-Gomez et al., "Vulcan petawatt-operation and development," *J. de Physique IV (Proceedings)*, 133: 555-559. EDP sciences (Jun. 2006).

Lee et al., "Activation analysis of indium, KCl, and melamine by using a laser-induced neutron source," *J. Korean Physical Society*, 64(7): 982-986 (Apr. 2014).

Lancaster et al., "Characterization of $^7$Li $(p, n)^7$ Be neutron Yields from Laser Produced Ion Beams for Fast Neutron Radiography," Physics of Plasmas, 11(7): 3404-3408 (Jul. 2004).

Mason et al., "Scalable Design for a High Energy Cryogenic Gas Cooled Diode Pumped Laser Amplifier," *Applied Optics*, 54(13): 4227-4238 (May 1, 2015).

Mihalczo et al., "Nuclear Material Identification System with Imaging and Gamma-Ray Spectrometry for Plutonium, Highly Enriched Uranium, High Explosives, and Other Materials," Oak Ridge National Laboratory, ORNL/TM-2012/22, 13 pp. (Feb. 2012).

Mirfayzi et al., "Calibration of Time of Flight Detectors Using Laser-Driven Neutron Source," *Review of Scientific Instruments*, 86, 073308, 7 pp. (Jul. 29, 2015).

Moulin et al., "X-Ray Imaging Modalities for Nuclear Waste Drums Inspection," Proc. 16th World Conference on NDT, Montreal, Canada, 8 pp. (2004).

Roth et al., "Bright Laser-Driven Neutron Source Based on the Relativistic Transparency of Solids," *Physical Review Letters*, 110(4): 044802 5 pp. (2013).

United Kingdom Intellectual Property Office, Search Report in United Kingdom Patent Application No. GB1519758.5, 1 p. (dated May 26, 2016).

European Patent Office, International Search Report in International Patent Application No. PCT/GB2016/053488, 3 pp. (dated Feb. 10, 2017).

European Patent Office, Written Opinion in International Patent Application No. PCT/GB2016/053488, 9 pp. (dated Feb. 10, 2017).

* cited by examiner

INSPECTION OF NUCLEAR WASTE

CROSS-REFERENCE TO RELATED APPLICATIONS

This application is a national phase application of International Patent Application No. PCT/GB2016/053488, filed Nov. 8, 2016, which claims priority to Great Britain Application No, GB1519758.5, filed Nov. 9, 2015, both of which are incorporated by reference herein in their entireties for all purposes.

TECHNICAL FIELD

The present invention relates to methods and apparatus for inspecting nuclear waste. For example, aspects of the invention relate to the inspection of units of nuclear waste such as intermediate nuclear waste mixed with a filler and contained within steel drums.

BACKGROUND

The handling of nuclear waste, especially from the nuclear power generation industry, typically consists of a number of different storage strategies depending on the type and radioactivity of each waste. Legacy nuclear wastes, which in some cases have arisen from previous complacencies preventing the management of ex-military and civil waste, are also present and in some cases require urgent extraction from current storage, reprocessing and packaging in order to transform the material into a safer, controlled and monitored volume.

Due to the high radioactivity and unpredictable corrosion products exhibited by intermediate and high level nuclear wastes, it is exceptionally difficult to accurately analyse simple parameters which describe the waste contents and therefore define the risks posed by particular storage scenarios, since either the physical containments are opaque or the waste inaccessible, even for some well managed and controlled storages. Such parameters include identification of the material, shapes and sizes of material and any associated hazards such as gaseous hydrogen production.

For example, intermediate level nuclear waste (ILW) arising from the defueling of Magnox reactors in the UK consists of 500 litre stainless steel drums infilled with Magnox cladding, aluminium, uranium and steel, encapsulated in a grout mixture of Ordinary Portland Cement and Blast Furnace Slag. Although originally designed to last for 'at least 50 years', recent inspections have shown that after about 30 years in storage, a small portion of the containers are beginning to exhibit signs of degradation and deformation as a result of the metals corroding within. Management of these particular containers is thwarted by the inability to identify the exact cause of the deformation and therefore their suitability for future interim storage over the coming decades or more without repackaging and the risk posed if, for example, the container was breached by the swelling or dropped during transportation.

Similar environments have shown that the potential production of pyrophoric material is a recognised risk within these containers. The legacy wastes present in Magnox waste storage facilities in the UK are another example where limited material identification hinders waste processing and storage. Since the waste is situated at the base of deep ponds and accumulated in 'sludge' type formations, to determine the quantity of fissionable material present and therefore to control criticality before and after extraction and containment by other means is currently very difficult to achieve.

As the time for preparing a geological disposal facility draws closer, there is a requirement to accurately characterise and evaluate the stability and suitability of current nuclear waste packaging, repackaging and storage methods for the safe future storage, transportation and eventual disposal of waste. Currently, there are two main approaches for accomplishing this: (1) direct investigation of the waste and (2) analytical studies of simulated waste to determine predictive corrosion rates and mechanisms occurring.

At present, direct analysis of the waste includes conventional means of radiation detection and visual or video monitoring over long periods of time to detect external changes in the system. These methods do not have the capability of characterising the waste morphology or chemistry and thus are incapable of identifying potential risks in the waste form.

Alternatively, some studies have proceeded to simulate waste environments computationally or in the laboratory to predict a particular metal behaviour in the waste environment, or the stability of the waste containment for the future. Finite element modelling has become a useful tool for understanding the mechanical behaviour of waste containers under the extreme conditions presented by radioactive corroding material. However, successful predictive models require parameters extracted from experimental data, which although is abundant, is only accurate from studies performed in almost identical conditions to the waste; of which there are few, if not none.

To overcome this, the nuclear industry has resorted to extracting parameters from similar corroding systems, such as the corrosion of reinforcement steel in concrete to represent Magnox and uranium corrosion in ILW containers, highlighting the need for in-situ studies of metals retained in grout media, since grout is a chemically and physically evolving system and therefore solubility limiting metal-mineral phases, metal mobility, corrosion phases and mineral components will change over time, the latter of which are often represented under saturated in model solutions.

The main problem with in-situ corrosion experiments is that current waste has resided in the waste form for several decades, typically up to about 60 years, thus analogous experiments should be corroding for similar time periods if not longer, which is both time consuming and costly. Consequently, the only accurate way of characterising a waste form is to physically investigate it. Owing to the potential volumes of pyrophoric and radioactive material that would be exposed to oxygen and the environment through this method, this option is clearly not attractive.

It would be desirable to provide improved methods and apparatus for inspecting units of nuclear waste.

SUMMARY OF THE INVENTION

The invention provides use of a laser driven source of ionizing radiation, for example a multi-modal source, for the inspection of units of nuclear waste, in which the ionizing radiation is generated by a short, high power laser pulse directed at a target which is typically a solid target, but could also or instead by formed of gas and/or liquid. The generated ionizing radiation may typically comprise one or both of X-rays and neutrons, but may also or instead comprise protons, electrons and other particles. In particular, use of a single laser system to irradiate a single target structure to generate multiple types of ionizing radiation is advantageous is providing a more compact and cost effective inspection system for nuclear waste.

To penetrate and analyse industrial stored units of high density radioactive material in waste containers with high resolution and quality, simulations carried out by the inventors have demonstrated that using electromagnetic radiation which energies of the order of 6 MeV is beneficial. Commercially available accelerator-based technology (e.g. linacs) or radioactive sources can generate X-ray beams with energies required for this application (>6 MeV), but the doses typically delivered permit tomographic imaging only with very long exposure timescales of minutes to hours for a particular unit of nuclear waste, and the nature of such X-ray sources limits the imageable resolution to about 1 mm at best. High power laser driven photon sources can generate X-ray beams with the required energy and have the favourable beam qualities for this imaging challenge of high photon brightness and small source size of significantly less than 1 mm, down to sizes of the order of ten microns. Moreover, other types of ionizing radiation suitable for determining complementary data about the subject unit of nuclear waste can be generated using the same laser pulse, for example when incident at a compound or composite target structure.

In particular, the ionizing radiation may be generated by the incidence of one or more very high intensity laser beam pulses directed to one or more targets or target structures. The laser beam pulses may typically be in the visible or infrared range. The ionizing radiation may comprise both X-rays generated by incidence of the laser beam pulse onto an X-ray emitting target, such as a metal foil, and neutrons generated by high energy particles (in particular protons and ions) emitted from the X-ray emitting target being incident on an adjacent or proximal neutron emitting target, for example in a pitcher-catcher configuration.

The ionizing radiation is passed into and/or through a unit of nuclear waste, such as a steel drum containing intermediate level nuclear waste embedded in a grout or other cementitious filler. Ionizing radiation passing through the container may then be imaged using one or more detectors. Multiple images of the radiation, for example following rotation of the container relative to the radiation source, may then be used for tomographic reconstruction of some or all of the contents or interior of the container. Spectral detection of high energy radiation which has been inelastically scattered within the container may also or instead be used to detect chemical and other properties of the material within the container.

In particular, the invention provides a method of inspecting a unit of nuclear waste, comprising: positioning the unit of nuclear waste between a target structure and at least one particle detector; generating a laser beam pulse; directing the laser beam pulse to the target structure to cause the target structure to emit ionizing radiation; detecting the ionizing radiation at the at least one particle detector following passage through the unit of nuclear waste; and determining properties of the unit of nuclear waste from the detected ionizing radiation.

For example, the invention may provide a method of inspecting a drum of intermediate level nuclear waste, comprising generating X-rays and neutrons using a single laser pulse directed at a pitcher-catcher laser target, separately detecting the X-rays and neutrons after passage through the drum, and detecting a transmission image of the drum using at least one of the X-rays and neutrons. This method may be repeated at a rate of at least 0.1 Hz or more quickly at a rate of at least 1.0 Hz, to create multiple images from one or both of the X-rays and neutrons, moving the drum between the repetitions, and carrying out a tomographic reconstruction of the interior of the drum using the multiple images.

More generally, the unit of nuclear waste may comprise a container such as a drum, for example a steel drum. The container may then contain intermediate level nuclear waste, which may be mixed with a filler such as a filler comprising a cementitious material. The maximum and minimum dimensions of the unit of nuclear waste may both within a range from 30 cm to 300 cm.

The target structure may comprise an X-ray emitting target, such as a solid target, for example a foil, and the ionizing radiation then comprises X-rays. The portion of the X-ray emitting target irradiated by the laser pulse is immediately destroyed, so a running tape, rotating wheel, or other mechanism for renewing the target portion exposed to a subsequent laser pulse may be provided.

The target structure may also comprise a neutron emitting target. The neutron emitting target may be proximal to the X-ray emitting target in a pitcher-catcher configuration, for example parallel the X-ray target, and the ionizing radiation then also comprises neutrons which may be passed through a neutron moderator to reduce the energy of the neutrons before passage through the unit of nuclear waste.

The laser beam pulse at the X-ray emitting target, or other part of the target structure where the laser pulse strikes, may have an intensity of at least $10^{17}$ W/cm$^2$, and may have a spot size of less than 1 square millimetre.

Different particles of ionizing radiation emitted by the target structure may be detected by the same or different detectors. Different particles, for example X-rays and neutrons may be separately detected even by the same detector, for example using time of flight separation.

The invention also provides determining properties of the unit of nuclear waste comprising generating one or more images of at least part of the unit of nuclear waste from the detected ionizing radiation, for example comprising generating a separate image from each of one or more of X-rays and neutrons in the ionizing radiation.

The steps of generating, directing and detecting may be repeated at a rate of at least 1 Hz. If the unit of nuclear waste is moved to different positions relative to the target structure between at least some of the repetitions (which could involve moving any combination of the target structure, the unit, and the detector(s), then multiple images of at least part of the unit of nuclear waste from corresponding multiple positions of the unit of nuclear waste relative to the target structure may be obtained. The method may then further comprise carrying out a tomographic reconstruction of at least part of the unit of nuclear waste using the multiple images.

By changing spacings between one or more of the target, the unit and detector(s) different magnifications of the unit and magnifications of parts of the unit may be obtained at the detector(s). Since the X-ray source may be very small using the described invention, for example less than 200 or 100 µm in diameter, or even less than 10 µm in diameter (or largest diameter, noting that the source may typically be roughly circular or elliptical), features of corresponding scales in the unit of nuclear waste may be detected and distinguished.

The methods may comprise detecting spectral properties of the ionizing radiation, and determining properties of the unit of nuclear waste from the detected ionizing radiation comprises determining properties of the unit of nuclear waste from the spectral properties. For example, particular products of waste degradation such as metal hydrides, hydrogen gas, may be detected in this way, either by one or more imaging detectors with spectral capability, non-imaging spectral detectors, or both.

The invention also provides apparatus corresponding to the above methods, for example apparatus for inspecting a unit of nuclear waste comprising: a laser system arranged to generate more or more laser beam pulses; a target structure arranged to receive the one or more laser beam pulses and to thereby emit ionizing radiation; and one or more detectors arranged to detect the ionizing radiation following passage through a unit of nuclear waste. The target structure may contain an X-ray emitting target arranged to generate X-rays, for example with a source diameter of less than 200 or 100 μm. The apparatus may also be arranged to provide a repetition pulse rate of at least 0.1 Hz, and to separately detect radiation passed through the unit of nuclear waste in respect of each such repetition. The apparatus may then comprise an analyser comprising a tomographic function arranged to derive three dimensional structure internal to the unit of nuclear waste from detector images of the ionizing radiation.

BRIEF DESCRIPTION OF THE DRAWINGS

Embodiments of the invention will now be described, by way of example only, with reference to the accompanying drawings, of which.

DETAILED DESCRIPTION OF EMBODIMENTS

Figure 1:
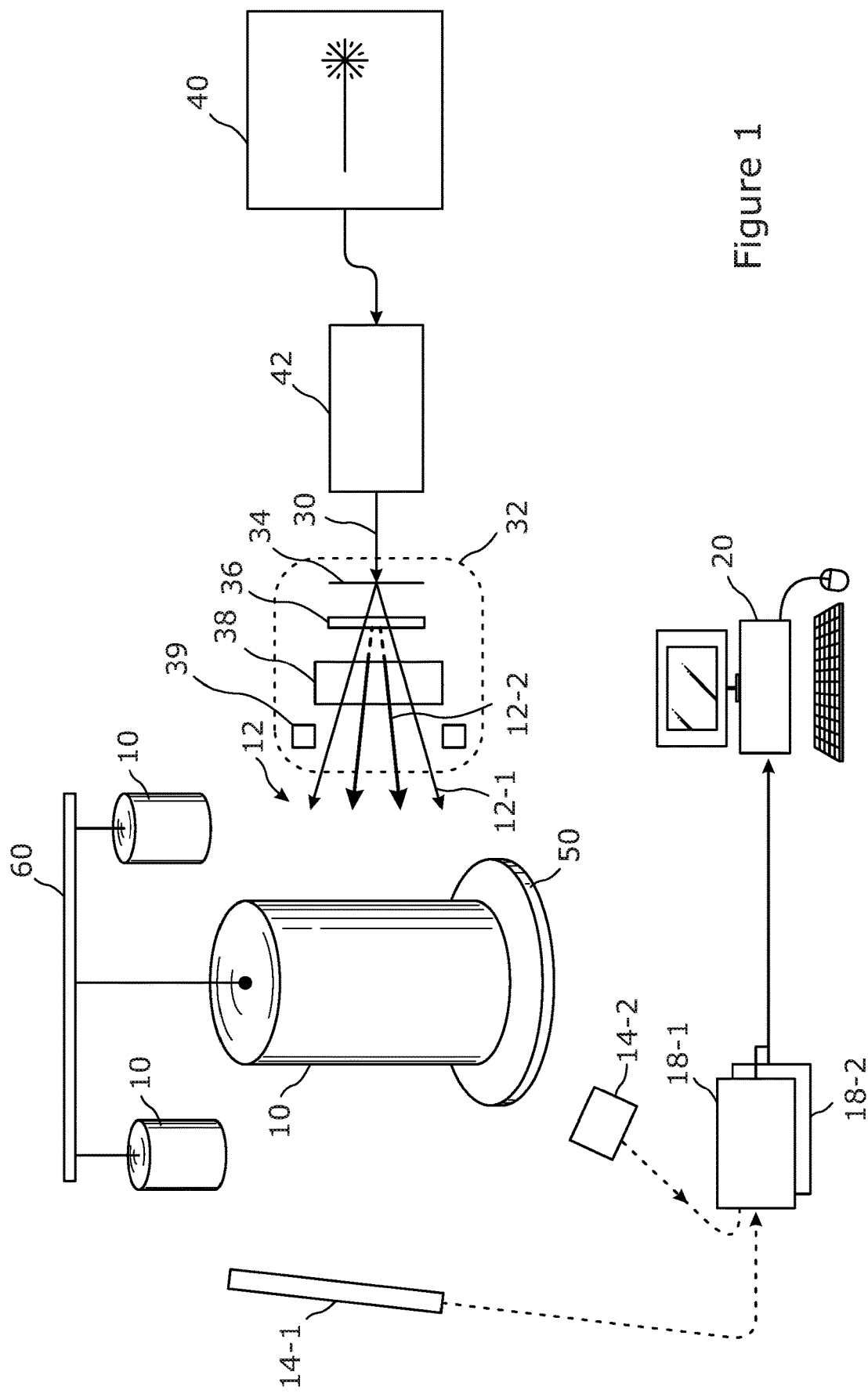
FIG. 1 illustrates methods and apparatus for inspection of a unit of nuclear waste such as a drum of ILW, using a laser drive source of ionizing radiation.

Referring now to FIG. 1 there is shown an arrangement for inspecting a unit of nuclear waste 10. In FIG. 1 the unit of nuclear waste 10 is a steel drum containing intermediate level nuclear waste mixed with a filler comprising a cementitious material, although other types and configurations of units of waste may instead be inspected.

The unit of nuclear waste 10 is inspected using ionizing radiation 12 which passes into and/or through the unit of nuclear waste for subsequent detection by one or more detectors 14-1 . . . 14-n, following various degrees of absorption, elastic scattering and inelastic scattering which depend on the nature of the nuclear waste and the type and energy spectra of the ionizing radiation. In the arrangement of FIG. 1, the ionizing radiation comprises both X-rays 12-1 and neutrons 12-2. These can be distinguished and at the detectors in various ways, for example by time-of-flight separation, whereby the neutrons arrive at a detector 14-1 after the X-rays due to their slower velocity, separation by particle energy, and by sensitivity of different detectors and detector materials.

Having passed through the unit of nuclear waste 10, the ionizing radiation 12 may be used to provide an image of at least a portion of the unit, for example using an imaging or pixellated detector 14-1, such an image representing one or more types of detected ionizing radiation, for example X-rays, neutrons, or both. Plural pixellated detectors may be used, for example in order to separately detect different types of ionizing radiation, to be located at different distances or in different directions from the unit, or to carry out different types of measurement such as total intensity measurements, and spectral measurements which determine aspects of the energy spectra of the ionizing radiation. Other, non-pixellated detectors 14-2 may also or instead be used, particularly for spectral measurements or to detect aspects of the ionizing radiation with increased sensitivity.

Data representing the detected ionizing radiation may be suitably collected, assembled or generated by one or more detector controllers 18-1 . . . 18-n, and then passed to one or more analysis elements 20. Properties of the unit of nuclear waste 10, derived from the detected ionizing radiation 112, may be determined by the detector controllers and/or the analysis elements, for example as one or more transmission or absorption images of all and/or parts of the unit 10, one or more tomographic reconstructions of the unit 10, images or data showing chemical specific information, and so forth. The one or more analysis elements 20 may typically be provided by suitably programmed general purpose computers. The detector controllers may comprise electronics specifically designed for interfacing with the detectors 14-1 . . . 14-n, and may also comprise programmed processor elements.

The ionizing radiation is generated by directing a high intensity laser beam pulse 30 at a target structure 32. The target structure comprises one or more target components. In order to generate suitable X-rays and neutrons in the arrangement of FIG. 1 the target components include an X-ray emitting target 34 onto which the laser beam pulse 30 is incident, and a neutron emitting target 36 onto which energetic particles from the X-ray emitting target are incident so as to generate neutrons. The X-ray emitting target 34 and the neutron emitting target 36 may be arranged in a pitcher-catcher configuration, for example as described in M. Roth et al, 2013, Physical Review Letters, 110, 044802, and Lancaster K L et al 2004 Phys. Plasmas 11 3404. In FIG. 1 the target structure also comprises a neutron moderator 38 which is arranged to reduce the energy of the neutrons to a level at which they interact more strongly with the unit of nuclear waste. Other elements 39 may be used for example to limit, block, collimate or otherwise manipulate or control the way in which the generated ionizing radiation is delivered to the unit of nuclear waste.

The laser beam pulse 30 is generated using a laser system 40 capable of generating very short pulses of laser light, at very high intensities, and the laser beam pulse 30 is then directed to the target structure using suitable delivery optics 42 and/or other transmission structures.

In FIG. 1, a single target structure 32 is used to generate the ionizing radiation for inspection of the unit of nuclear waste, but multiple separate target structures may be used if required, for example with each target structure being configured for generating a different type or spectrum of ionizing radiation. Such multiple target structures could be driven by multiple beams from the same laser system 40, or multiple laser systems could be used to drive the multiple target structures or a single target structure. However, the arrangement of FIG. 1 in which a single laser system 40 is used to irradiate a single target structure 32 to generate multiple types of ionizing radiation is advantageous is providing a more compact and cost effective inspection system.

The described apparatus may be arranged to inspect the unit of nuclear waste 10 using a sequence of temporally spaced laser beam pulses 30 to generate a sequence of temporally spaced bursts of ionizing radiation 12, preferably to provide multiple separate temporally spaced detections of the ionizing radiation 12. Such a sequence of pulses may operate, for example, at a rate of 0.1 Hz or faster, and more preferably at a rate of at least 1 Hz. The apparatus of FIG. 1 illustrates the unit of nuclear waste 10 being moveable by means of a manipulator 50 such as a turntable so that the unit is in a different position for each of a plurality of such bursts of ionizing radiation. In this way, a series of transmission or absorption images or other images of the unit 10 may be taken, each corresponding to a different position and/or orientation of the unit with respect to the target structure and/or the detector(s). Such images may then be combined, for example using a tomographic process, to generate a tomographic reconstruction or other representation of the interior of the unit of nuclear waste.

FIG. 1 also illustrates a transport mechanism 60, for example comprising a conveyor, arranged to deliver a series of similar units of nuclear waste 10 to be inspected by the apparatus, one after another. In this way, apparatus arranged to automatically inspect a plurality of units of nuclear waste may be provided.

Although in FIG. 1 the unit of nuclear waste 10 is shown as a steel drum containing intermediate level nuclear waste mixed with a filler comprising a cementitious material, various other types and configurations of units of nuclear waste may instead be inspected. For example, more generally the unit may comprise a container within which the nuclear waste is contained, and the container may be in the form of a drum, a box, a pipe etc. Such a container could be made of a metal such as steel, a polymer such as a plastic, a concrete, other materials, or multiple ones of these materials.

The nuclear waste may typically comprise intermediate level nuclear waste (ILW) such as metal fuel cladding and reactor components, graphite from reactor cores, and sludges from treatment of radioactive liquid effluents. Intermediate level nuclear waste may also or instead be defined as waste with radioactivity levels exceeding the upper boundaries for low-level wastes, but which do not require heating to be taken into account in the design of storage or disposal facilities. ILW may also be defined as waste exceeding four gigabecquerels per tonne (GBq/te) of alpha or 12 GBq/te of beta/gamma activity. However, the nuclear waste may instead or additionally comprise high level nuclear waste such as the liquid residue that contains most of the radioactivity from the reprocessing of spent nuclear fuel, this material following solidification, spent fuel (if it is declared a waste), or any other waste with similar radiological characteristics. High level nuclear waste may be considered to be waste that is radioactive enough for the decay heat to significantly increase the temperature of its surroundings. The nuclear waste may instead of additionally comprise low level nuclear waste such as various lightly contaminated material from maintenance and monitoring, including plastic, paper and metal, and decommissioning material such as soil, building materials and metal plant and equipment.

In some circumstances, the nuclear waste may be packed inside a container without mixing with other materials. However, the waste may commonly be mixed with a grout, cement, or cementitious filler such as a concrete including a mixture of materials. Waste may also or instead be vitrified into a glass matrix, compacted, or solidified in various ways.

A unit of nuclear waste for use with the invention may preferably be of a size which is large enough for inspection using ionizing radiation to be particularly beneficial for probing the interior of the waste where obtaining a reasonably comprehensive view by direct probing is difficult, without being so large as to make implementation of the invention difficult by virtue of the low fraction of radiation which penetrates the unit, the size of the detectors needed, or other factors. For example, the units of nuclear waste may have overall dimensions which lie in the range from 30 cm to about 300 cm inclusive.

Typically, to generate suitable ionizing radiation at the target structure, laser pulses with an intensity of greater than $10^{17}$ W/cm$^2$ are required, with typical intensities for the arrangement of FIG. 1 being in the region of $10^{18}$-$10^{20}$/cm$^2$. To achieve these intensities, a spot size at the target structure having a diameter in the region of 5 to 100 or 200 μm, and a pulse duration of a few picoseonds to a few tens of picoseconds would be typical. The laser beam pulse may typically have a wavelength in the visible or near infrared range, for example between about 800 nm and 1050 nm, although other wavelengths may be used. The energy delivered in such a single laser beam pulse may typically be from a few Joules through a few tens of Joules to more than a hundred Joules. Laser systems suitable for generating such laser beam pulses are now available, for example from Thales and other providers. One such example may be seen at: https://www.thalesgroup.com/sites/default/files/asset/document/alpha_pw_2014_0.pdf.

Generating bright pulses of X-rays and neutrons from a solid target and pitcher catcher configuration may require high energies of around 100 Joules or more, currently available at various national laboratory facilities such as the Vulcan laser system at the Science and Technology Facilities Council, Central Laser Facility, see Hemandez-Gomez C. et al. 2006, J. Phys. IV France 133 555-9 and http://www.clf.stfc.ac.uk/CLF/Facilities/Vulcan/12248.aspx and are in development for commercial availability, see P. D. Mason et al, Appl. Opt., 54 4227 38 (2015).

The X-ray generating target, if used in a particular embodiment of the invention, may typically comprise a foil or other thin layer of a solid material such as a metal. Suitable metals may include gold, tantalum, copper and aluminium, although other high z number materials may be used, including plastics. The thickness of the target may typically be in the range from about 1 μm-100 μm. When the laser beam pulse is incident on the target, the area of the target local to and proximal to the beam is destroyed. For arrangements where a sequence of laser pulses are used to generate a sequence of bursts of ionizing radiation, a rotating wheel, a moving tape or some other arrangement carrying continuous or discrete areas of target material may be provided.

With a laser beam as described above, having an intensity in the region of $10^{18}$-$10^{20}$ W/cm$^2$, a resulting X-ray flux will be emitted by the X-ray target having a peak flux in the region of 10 keV to 1 MeV, but with a significant tail of X-rays having energies in the region from 1 MeV up to about 100 MeV, noting that the energy distribution is expected to be approximately Maxwellian. For the inspection of units of nuclear waste as described herein, is it desirable to be able to generate and detect X-rays in the region of about 2-20 MeV.

Note that it is conventional to describe this type of ionizing radiation as X-rays, despite the high energies which fall in the range of Gamma radiation, because this X-ray radiation is generated using bremstrahlung type mechanisms involving electron scattering, and not the nuclear type mechanisms usually associated with Gamma ray production.

The X-ray source provided by the described arrangements has a spatial extent closely associated with the spot size of the laser beam pulse at the X-ray generating target, so the diameter of the X-ray source may conveniently be less than 1 mm, and more typically less than 100 μm, for example in the range of 5 to 100 μm, or preferably less than 2001 μm. This small spot size enables very fine scale detail of the nuclear waste to be detected.

The neutron generating target, if used in a particular embodiment of the invention, may typically comprise a layer of a suitable solid material having a good cross section for proton/ion driven neutron generation, typically spaced form the X-ray target by a few millimetres. Typical materials may include lithium, copper, beryllium, and plastics containing heavy isotopes of hydrogen. The thickness of the neutron generating target may typically be in the range of a millimetre to a few centimetres. The usual mode of operation of the neutron generating target is to receive protons and ions ejected from an adjacent or nearby X-ray generating target, in a pitcher-catcher configuration, and for these energetic protons and ions to give rise to an ejected neutron flux. Because of the spacing between the X-ray target, and the thickness of the neutron target, the effective size of the neutron source is expected to be larger than that of the X-ray source, for example in the range of about 100 μm up to a few cm, depending on the thickness of the neutron generating target and the spacing from the X-ray target.

The raw emission of neutrons from the neutron generating target will typically have a lower bound to the neutron energy in the region of a few hundred keV, with the spectrum extending to around 10 MeV. For some embodiments, it may be desirable to reduce the neutron energy considerably in order to control the collision cross sections and degree/nature of interaction of the neutrons with the nuclear waste, for example to make the neutrons thermal or epithermal (typically to just a few eV of few 10's of eV). This can be achieved using a neutron moderator 38 as illustrated in FIG. 1. Such a moderator may typically be formed of tungsten or other metals, plastics, or combinations of such materials, and may typically be a few tens of cm thick and spaced from the neutron generating target by a few cm, although various configurations may be used according to specific designs and requirements Although the use of high energy X-rays and neutrons is described in detail in this document, other forms of ionizing radiation may be used in embodiments of the invention to inspect units of nuclear waste, including electrons, protons, and terahertz emissions. The ability to cross examine a unit of nuclear waste utilising a variety of radiation types enables a combination of multiple inspection techniques in a single laser-driven system, delivering time and cost efficiency, especially for inspection of material on the mass number scale.

Suitable detectors for detecting the ionizing radiation used to inspect the units of nuclear waste may be constructed in various ways, including using scintillation materials, and active media imaging plates. For example, a suitable imaging detector for the X-ray component(s) of the radiation may be constructed using a pixellated crystalline layer of caesium iodide doped with suitable materials such as thallium and or sodium, whereby the dopants within the caesium iodide exhibit luminescence when an X-ray strikes a particular pixel. The pixellation provides optical isolation between adjacent pixels, for example using slots which may be filled with another material, so that a spatial resolution corresponding to the lateral extent of a pixel can be achieved, for example of the order of 1 mm or so, while using a detector of greater thickness and therefore sensitivity, for example of the order of 10-50 mm. The luminescence triggered by passing of X-rays through pixels can be read in various ways, for example by using a CCD, CMOS or other optical camera provided with a field of view corresponding to the pixellated scintillation layer. An appropriate field of view can be arranged using one or more suitable mirrors if necessary to enable the camera to be located away from the path of the ionizing radiation.

Neutrons can be detected using the same type or similar types of pixellated scintillation detectors to the X-rays, and indeed both types of radiation may be detected using a single such detector if desired. In order to distinguish between X-rays and neutrons (and/or other non-photon particles), a time of flight scheme can be used, noting that the X-rays have the velocity of light corresponding to about 3 nanoseconds to travel one metre, whereas thermal neutrons will take around a few to a few tens of milliseconds to cover the same distance.

Neutron detection can also conveniently be carried out using a layer of material heavy in hydrogen, such as polythene, as a scintillation material, and this can be imaged by a CCD or CMOS camera in a similar way to a caesium iodide pixellated sensor.

It may be desirable to measure energies or energy spectra of X-rays, neutrons and other particles used to inspect the units of nuclear waste. This can be achieved, in the case of a thermal or epi-thermal particle imaging sensor, for example a neutron sensor, using time-of-flight principles and a sufficiently fast optical camera. For X-rays, and for other radiation types, scintillation detectors which detect the magnitude and therefore particle energy of each collision may be used.

Figure 2:
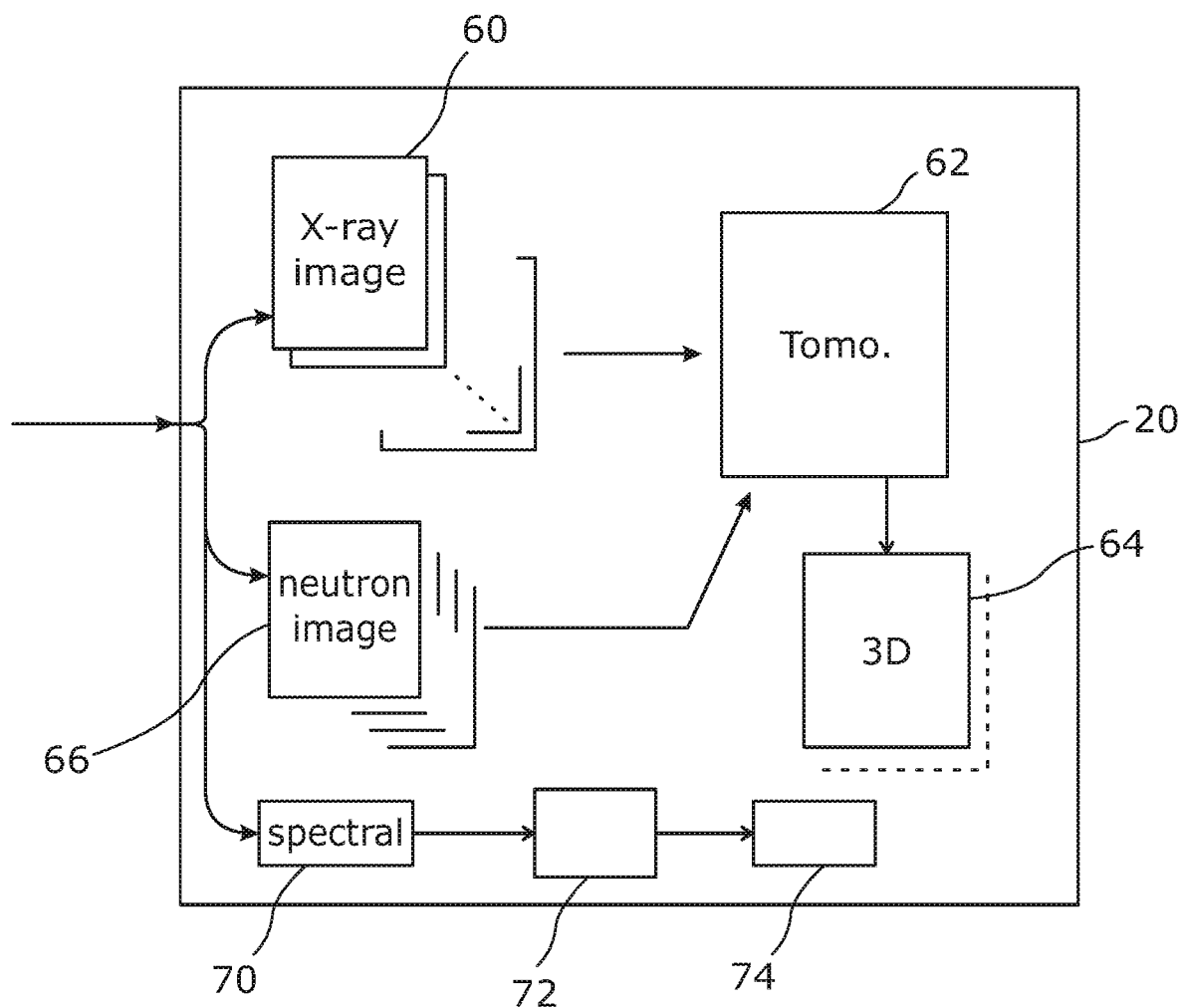
FIG. 2 shows aspects of the analyser of FIG. 1.

FIG. 2 illustrates how some of the data, acquired from detecting the ionizing radiation 12 after passing through the unit of nuclear waste, may be further used and processed, for example in analysis unit 20. FIG. 2 shows a collection of images 60 which are passed to a tomographic function 62 to carry out a tomographic inversion of the data contained in the images 60 in order to derive tomographic data 64 defining internal structure of the unit of nuclear waste, in three dimensions. The images 60 may be for example X-ray images acquired by an imaging detector 14-1. In FIG. 2 a further collection of images 66 is shown which may be images of another radiation type such as neutron images, which may be acquired using the same or a different imaging detector. These further images may also be used by the same or a different tomographic function 62 to derive internal structure of the unit of nuclear waste, either separately or in combination with the X-ray data.

FIG. 2 also shows spectral data 70 which has been acquired using one or more imaging detectors 14-1 or other detectors 14-2, which is then processed using spectral processing function 72 to derive resulting characteristics 74 of the unit of unclear waste. For example, such characteristics may identify the presence and/or location of particular chemical components such as metal hydrides within the unit, either at specific locations (for example by using tomographic principles, using image data, or by using a spectral detector with a narrow field of view), or more generally (for example by combining data from larger parts of an image, tomography output, or large field of view).

Figure 3:
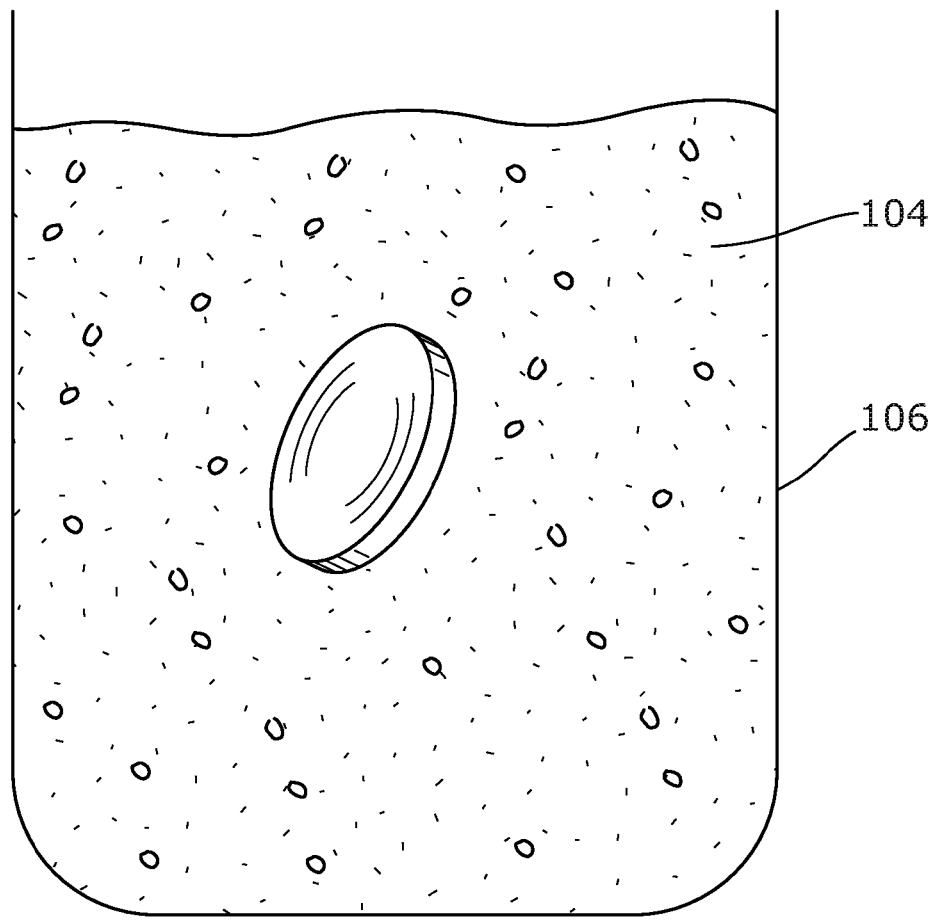
FIG. 3 shows an experimental mock up of nuclear waste used in demonstrating the invention.

Experiments carried out by the inventors in order to demonstrate the efficacy and practical aspects of the invention will now be described. A natural uranium 'penny' 102 with a diameter of 28 mm and thickness of 2 mm was cut from an unused, un-irradiated Magnox fuel rod. As shown in FIG. 3 the penny was encapsulated in Lafarge ready-mix concrete 104 inside a plastic container 106. The penny was not treated prior to encapsulation and therefore retained an as-received corrosion layer, which from previous analysis of the same material is approximately 50-70 µm thick and consists of uranium oxide ($UO_2$).

When a laser pulse with peak intensity $>10^{17}$ W/cm$^2$ is incident onto solid matter, the surface is instantaneously fully ionised to form a plasma. The laser electric fields then interact with the charged particles within the plasma state and accelerate a high current (mega Amp) of electrons in the laser forward direction. The electron beam generated has a Maxwellian spectral distribution and a bulk temperature of around 500 keV to several MeV, rendering the beam relativistic. A laser-driven electron beam generates a bright burst of bremsstrahlung x-ray radiation as the electrons interact with the atomic structure of the target material. Using thin, high atomic number target foils such as tantalum and gold results in plentiful bremsstrahlung interactions and therefore a high flux of high energy X-rays.

Figure 4:
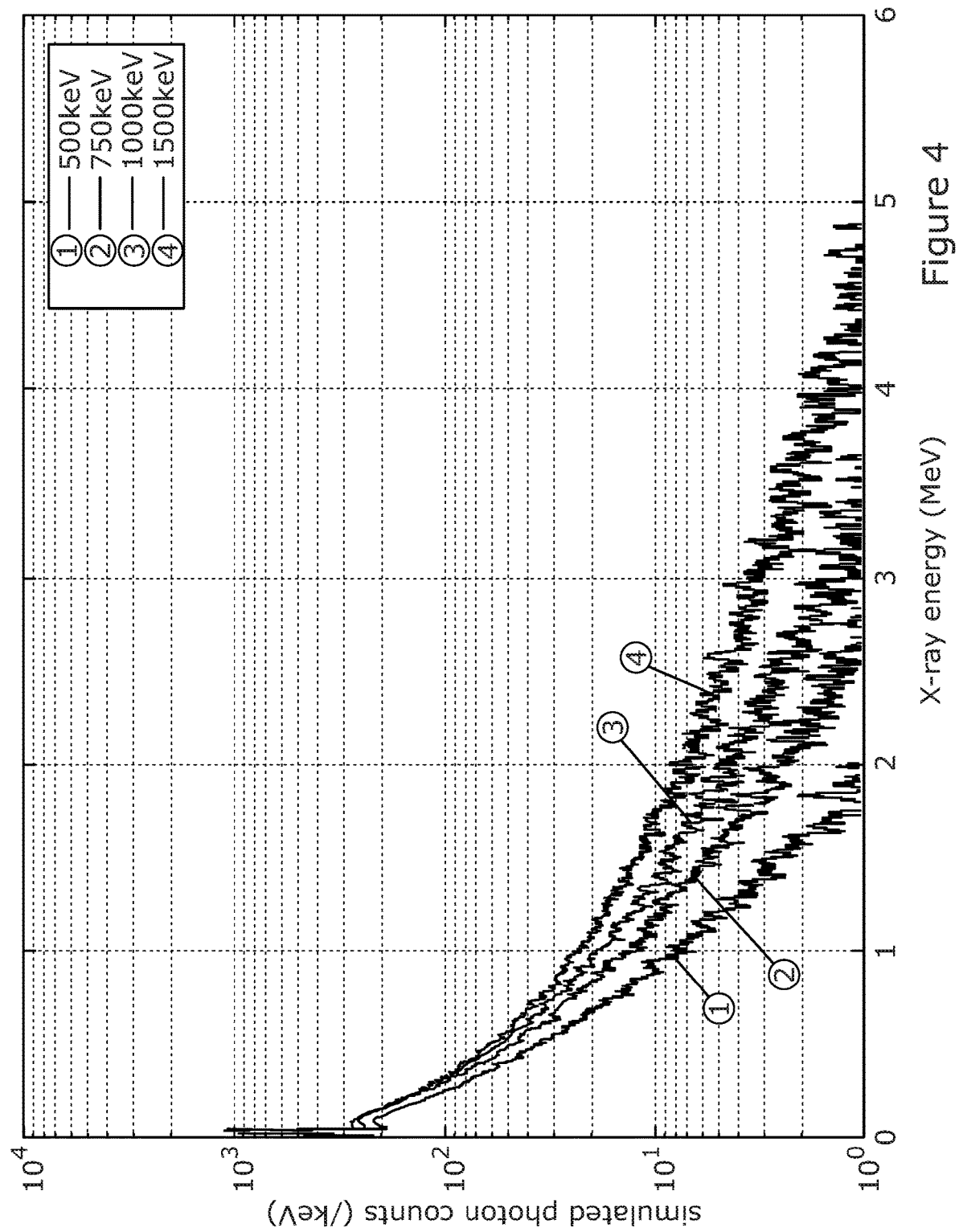
FIG. 4 is a graph of modelled X-ray energy distribution applicable to the target structure and laser system used in the described experiments.

Radiography on the sample of FIG. 3 was carried out utilising X-ray pulses generated during laser-solid interactions with the Vulcan laser at the Rutherford Appleton Laboratory, Harwell Campus, UK, described in Hemandez-Gomez C et al 2006 J. Phys. IV France 133 555-9. P-polarised, 1054 nm wavelength pulses of 10 picoseconds duration delivered ~150 J of laser energy onto 100 µm thick tantalum foil targets at 20 degrees incidence. In the current set-up, the bremsstrahlung energy peaked at 600 keV, above which the photon flux logarithmically decreased. A model of this distribution using GEANT4 (Agostinelli S et al 2003 Nucl. Instrum. Methods Phys Res. A 506 250-303) was used to simulate a variety of input electron beam spectra transmitting through a 100 µm tantalum foil and is shown in FIG. 4. By increasing and decreasing the laser intensity, the laser energy correspondingly increases and decreases respectively. This simulation shows that X-rays of >2 MeV were expected to be present during the current experiment.

BAS-TR and BAS-SR image plate (IP) detector film was used to capture the X-rays after transmission through the sample of FIG. 3 in order to produce absorption contrast radiographs. A 2D active scintillator-based detector, constructed of Thallium doped Caesium Iodide (CsI) pixels of width 500 µm×500 µm and thickness 1 cm, optically coupled to CCD chips, with full working area of 30 cm$^2$, was also fielded. This active detector provided instant images compared to the traditional IP film, for which digitising the signal at high resolution can take up to 1 hour for a single 20 cm×40 cm piece.

The sample was positioned outside the vacuum interaction chamber, level with the laser axis, at different distances in front of the detector place in order to image at various magnification factors. Contact radiography (magnification 1) of the test object was conducted with the IP detector placed directly behind the object plane. High magnification (>magnification 5) was carried out by extending the distance between object and CsI detector plane to 2.2 metres.

Figure 6A:
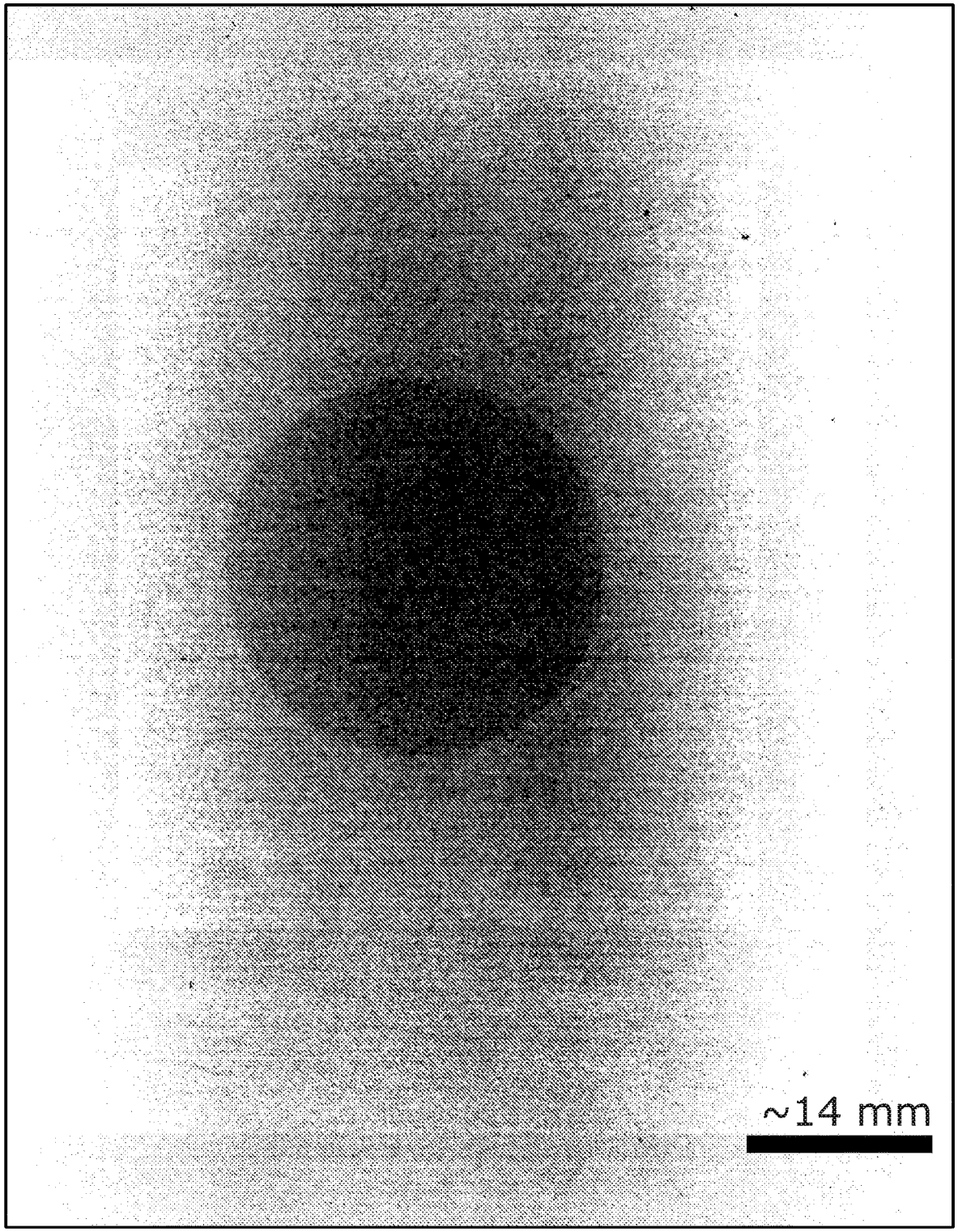
FIGS. 6a and 6b, and 7a and 7b, show X-ray images and corresponding sections through the images, demonstrating a uranium coin shaped sample and fine scale structure determined by X-rays in experiments carried out by the inventors.
Figure 6B:
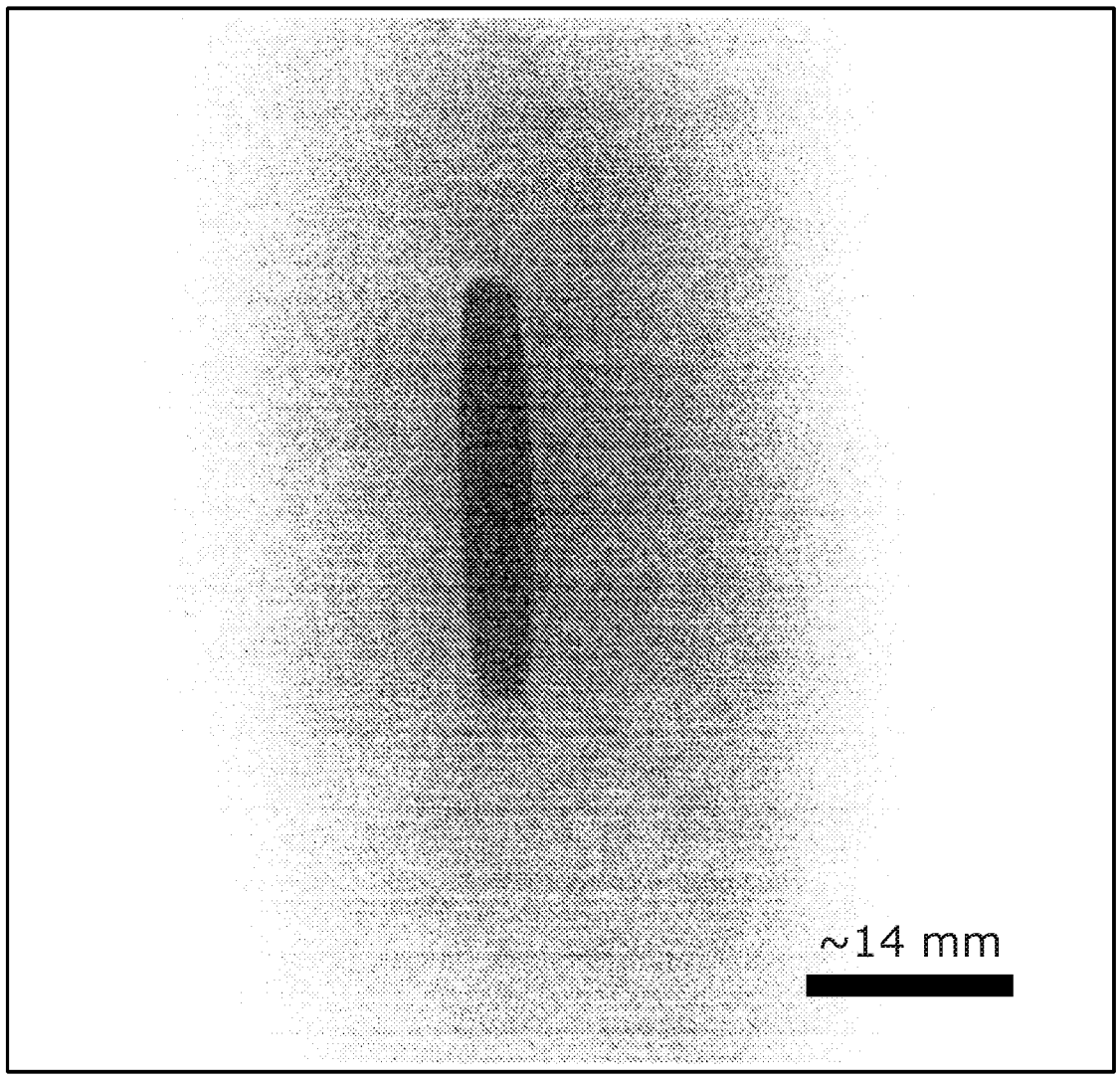

With basic image processing applied, the radiographs recorded of the cement encapsulated uranium, using the IP and CsI detectors clearly outlined the examined uranium penny through both its thinnest and thickest cross sections at low magnification, as shown in FIGS. 6a and 6b respectively, and at high magnification. During imaging, spectrometer measurements indicated an X-ray beam with bulk temperature of ~600 keV. A 2D transmission profile demonstrated the clear difference in transmitted signal between the grout and uranium, with lower transmission identified in the uranium position. The high magnification CsI detector radiographs displayed a lower contrast since the photon density at the detector plane (>2 meters from the source) is much lower and the 1.6 cm thick Cu attenuator absorbed a high proportion of the beam energy. In both examples, the spatial resolution and absorption contrast of the radiographs was not sufficient to identify the 50-70 µm thick, as-received, uranium oxide layer. However, this is a clear example of a radiograph taken of life sized uranium fuel using only a single pulse exposure of a laser-driven X-ray beam. The surrounding grout was observed to be intact with no obvious fracturing.

Figure 5:
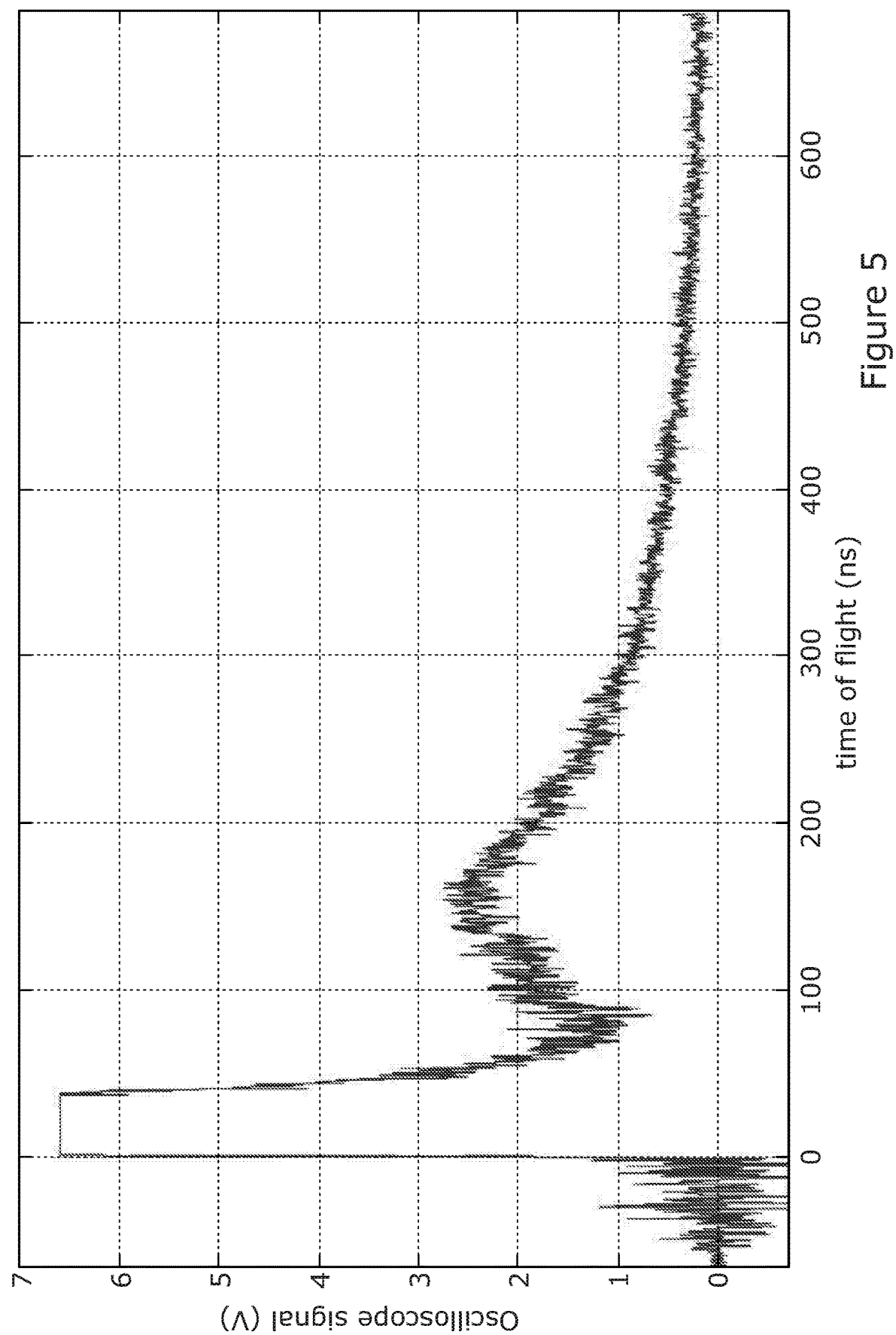
FIG. 5 plots the time of flight of particles detected in a described experiment showing an initial X-ray pulse followed by neutron arrivals at the detector.

In addition to X-rays, on a parallel beamline (still using the Vulcan laser), a beam of highly penetrating neutrons (energy 1-5 MeV) was generated, at a flux of 107-109 neutrons per steradian per pulse. FIG. 5 shows a time-of-flight signal recorded by oscilloscopes from plastic scintillators positioned within the neutron path. The saturated peak at time=0 represents a relativistic signal and therefore the initial X-ray flash from bremsstrahlung emission. This is further evidence for X-ray generation in the energy region of interest here (multi MeV energy), since the scintillators were positioned two meters from the source and shielded by 10 cm thick lead bricks which could only be penetrated by such energies. An increase in signal between 100-200 ns indicates radiation propagating at non-relativistic speeds but has also penetrated the lead shielding, indicating neutron generation.

The above experiment has demonstrated that without any modifications to the Vulcan laser-driven pulsed X-ray system, successful non-destructive radiography of units of nuclear waste, with spatial image resolution <<1 mm over a wide scan area of at least 30×30 cm, of medium mass high density material encapsulated in cement can be achieved with a single pulse exposure. With improvements to the laser infrastructure, such as increased repetition rate and efficiency, as well as improvements in the X-ray and neutron generation mechanisms, such as higher flux of >1 MeV X-rays and neutrons, this technique can clearly be used for additional advanced and multi-modal techniques for nuclear waste management testing. These include high energy X-ray tomography, neutron imaging, nuclear material identification, and criticality testing.

In further tests using the same set up, a spatial resolution test object was produced from a 5 mm thick, 100 mm×100 mm tungsten plate, designed to highly attenuate X-rays with energy <500 keV. The plate was wire-cut to produce resolution test pattern slits in the plate, of various widths down to 200 µm. The test object was positioned outside the vacuum interaction chamber, in the plane of the laser axis, at different distances from the detectors in order to image at various magnification factors.

Figure 7A:
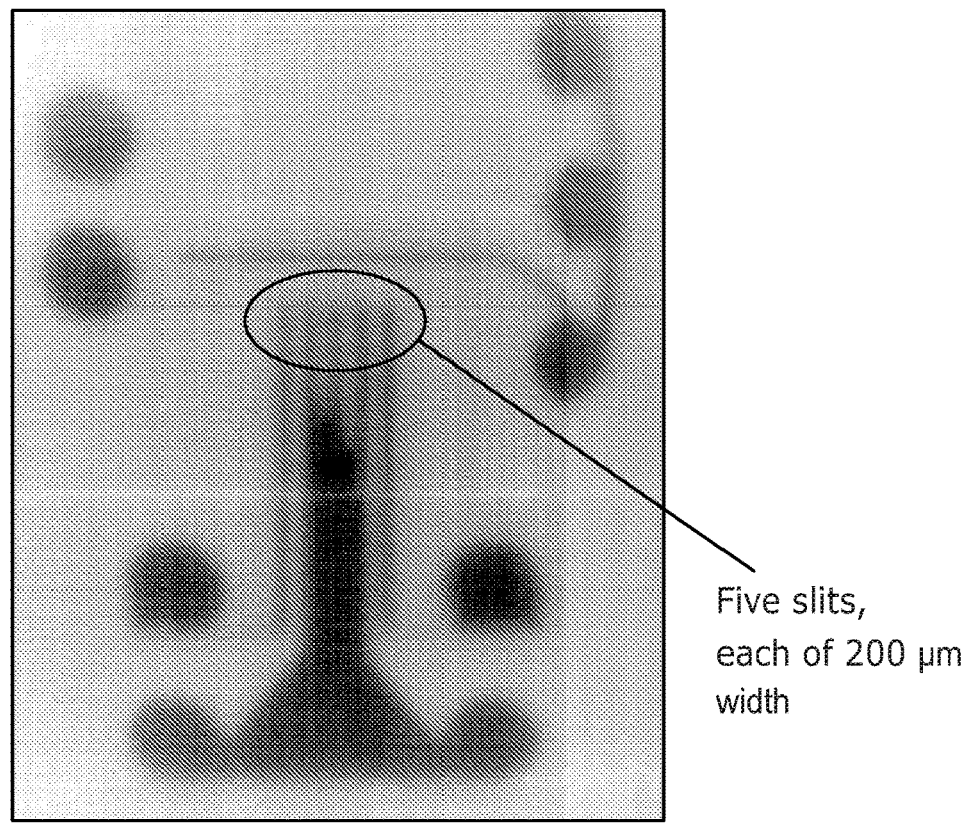

An important capability of laser-driven sources is in the delivery of high-resolution single-pulse projection imaging. At high magnification, during which the smallest features are projected over many pixels of the detector, the spatial resolution of an image is defined by the source emission area. In order to test the spatial resolution for projection imaging with this laser-driven source a high magnification radiograph of the 5 mm thick tungsten resolution plate was taken. FIG. 7a shows an image of 200 µm width gaps in the tungsten plate, projected with magnification factor 10 onto the active detector panel (pixel size 500 µm), that are visible with modulation transfer function (MTF) MTF=0.12±0.04, obtained with single pulse exposure, as shown in FIG. 7b.

Figure 7B:
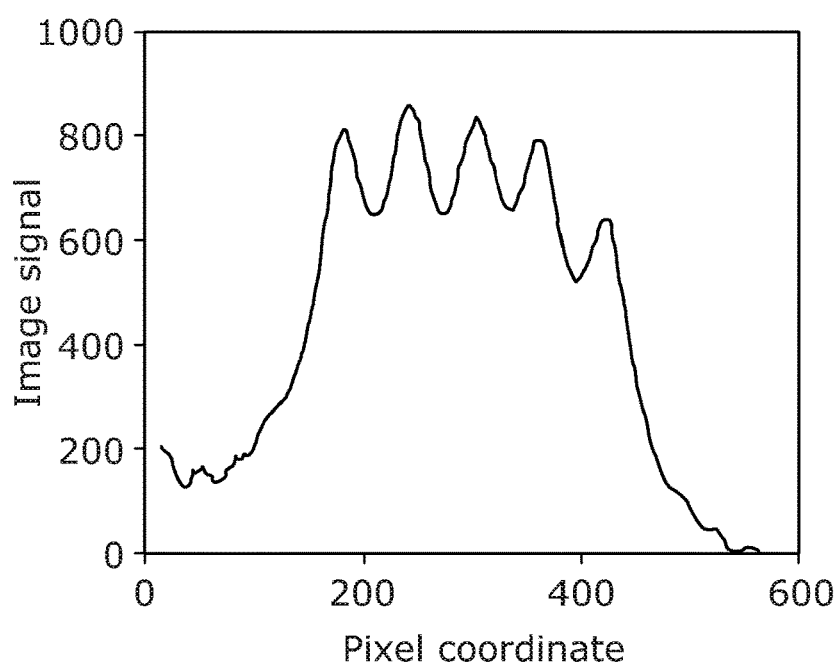

The experiment illustrated in FIGS. 7a and 7b demonstrates that features of much less than 1 mm size within a thick metallic background are visible under single-shot radiography acquisition when using laser-driven bremsstrahlung emission from laser-solid interactions coupled to an instant readout active detector located at a large standoff distance to the test object. This is a crucial demonstration of laser-driven X-rays for non-destructive testing and industrial radiography, as it indicates unique capability compared to conventional technology.

The combination of high energy (for example up to 10 MeV), high flux, single-shot acquisition and short pulse exposure for high resolution X-ray radiography of large, dense objects provided in a tunable laser-driven system provides flexibility to employ this technique on a range of units of nuclear waste under various conditions. The high brightness and energy, short duration (<<nanosecond) and sub 1 $mm^2$ emission area make these high energy X-rays particularly advantageous compared to their commercially available counterparts, such as linac systems, which cannot achieve all of these qualities in a single source. The X-ray beam can be moved over short distances and the dispersed shape permits a large field of view and therefore tomography of large objects. Simultaneous production of high energy, bright neutron beams can also be utilized to perform neutron radiography; a non-destructive, element specific (specifically identifying very low and high atomic numbers simultaneously) imaging technique.

Adequate nuclear waste scanning and inspection may benefit from the identification, approximate volume/mass and spatial distribution/location of one or more of i) high density material, ii) sensitive corrosion products, iii) fissile material and iv) pyrophoric material/gasses. The inventors have identified and demonstrated that laser driven photon sources can identify the location of the high density material and the relative distribution of material density using the uranium and cement's natural attenuation of the X-rays. Furthermore, real ILW containers often exhibit bulging which can be caused by expanding material located around their circumference. The point source and divergent nature of the photon beam is particularly useful for identifying this material since the transmission path is shorter here than transmitting through the centre of the container. Thus radiographs are expected to retain better contrast in these areas and evidence of this I seen in X-ray radiographs already obtained by the inventors using the above experimental arrangements. It is expected that low density corrosion products can also be identified using this method.

Tuning the source of the ionizing radiation to produce electromagnetic radiation in the 6 MeV range requires arrangement of the interaction conditions to a sufficiently high laser intensity, for example by increasing the laser energy and shortening the pulse duration to ~1 ps, transferring the bremsstrahlung energy profile peak further towards the MeV range, thus producing a greater flux of higher energy X-rays. Alternatively, this can be achieved by using different methods to accelerate the electrons, such as by passing the laser beam through gas capillaries and using bremsstrahlung convertor foils to generate X-ray emission with very short pulse lengths of 30-40 fs and source size down to ~30 µm. The laser-accelerated electron energy in this case is tunable from several hundred MeV up to GeV, generating average bremsstrahlung radiation of 10-100's MeV when the electron beam is passed through a convertor foil, for example see S. Cipiccia et al, Journal of Applied Physics, 111, 063302, (2012). However, the beam emission is much more collimated and the photon density is greatly reduced, rendering large field-of-view single pulse exposure image acquisition less feasible. Currently, progression and development of imaging at these high energies is limited by detector technology and instrumentation cooling. Detection of high energy gamma rays requires development of a high density, high resolution, large 2D scintillator detector with rapid acquisition and processing times. Although acquisition of a single image yields rapid data acquisition (for the CsI detector), multiple shots over a long time period, for example when performing tomographic analysis, is time limited to one pulse per 20 minutes since the laser systems is flash pumped and therefore requires cooling after each shot. This can be overcome by using a high power diode-pumped laser such as the DiPOLE system (Mason P D et al 2015 Appl. Opt. 54 4227-38), which are not only high power but can run at 10 Hz operation and are more efficient, more compact and permit deployability. Efficient cooling diode-pumped systems permit multiple shots per second operation minute, to produce better quality of imaging, image averaging and development of a tomography system, thus volumetric measurement of large mass, high density and low density materials.

Materials posing the most risk to the safe confinement of nuclear waste are typically hydrogen based, e.g. hydrogen gas or metal hydrides, or are highly active and therefore large accumulations of the material could reach criticality. Conveniently, neutrons are highly sensitive to hydrogen based compounds, thus neutron imaging can be used to efficiently identify their location and relative quantity. Neutrons have also previously been utilized for criticality testing, for example by nuclear materials identification systems, NMIS, as discussed in Mihalczo and Mullens, Oak Ridge National Laboratory report ORNLI/TM-2012/22, available at: https://www.nti.org/media/pdfs/Mihalczo_Mullens_2012_NMIS_lmaging_Gamma_Spectr_Pu_HEU_HE_other.pdf?_=1439478470. In this method, a time resolved analysis is achieved: neutrons that pass through active material induces fission, generating additional particles that are detected later than directly transmitted neutrons.

Although particular embodiments and applications of the invention have been described, it will be apparent to the skilled person that various modifications and alterations can be made without departing from the scope of the invention.

The invention claimed is:

1. A method of inspecting a unit of nuclear waste, comprising generating both X-rays and neutrons using a single laser pulse directed at a pitcher-catcher laser target structure, separately detecting the X-rays and neutrons after passage through the unit of nuclear waste, and generating a separate transmission image of the unit of nuclear waste using each of the detected X-rays and the detected neutrons.

2. The method of claim 1 wherein the unit of nuclear waste is a drum of intermediate level nuclear waste.

3. A method of inspecting a drum of intermediate level nuclear waste, comprising repeating the method of claim 2 to generate multiple images, moving the drum between the repetitions, and carrying out a tomographic reconstruction of the interior of the drum using the multiple images.

4. The method of claim 3 comprising carrying out separate tomographic reconstructions of the interior of the drum from the respective X-ray and neutron images.

5. The method of claim 1 wherein the pitcher-catcher laser target structure comprises an X-ray emitting target onto which the single laser pulse is incident, and a neutron emitting target proximal to the X-ray emitting target and onto which energetic particles from the X-ray emitting target are incident so as to generate the neutrons.

6. The method of claim 3, wherein the method is repeated at a rate of at least 1 Hz to generate the multiple images.

7. A method of inspecting a unit of nuclear waste, comprising:
positioning the unit of nuclear waste between a target structure and at least one particle detector;
generating a laser beam pulse;
directing the laser beam pulse to the target structure to cause the target structure to emit both X-rays and neutrons;
detecting the X-rays and neutrons at the at least one particle detector following passage through the unit of nuclear waste; and
generating a separate image of the unit from each of the detected X-rays and neutrons.

8. The method of claim 7 wherein the unit of nuclear waste comprises a container such as a steel drum containing intermediate level nuclear waste mixed with a filler such as a filler comprising a cementitious material.

9. The method of claim 7 wherein the maximum and minimum dimensions of the unit of nuclear waste are both within a range from 30 cm to 300 cm.

10. The method of claim 7 wherein the target structure comprises an X-ray emitting target to emit the X-rays.

11. The method of claim 10 wherein the target structure also comprises a neutron emitting target to emit the neutrons, the neutron emitting target being proximal to the X-ray emitting target in a pitcher-catcher configuration.

12. The method of claim 11 further comprising passing the neutrons through a neutron moderator to reduce the energy of the neutrons before passage through the unit of nuclear waste.

13. The method of claim 10 wherein the laser beam pulse at the X-ray emitting target has an intensity of at least $10^{17}$ W/cm$^2$ and a spot size of less than 1 square millimetre.

14. The method of claim 7 wherein detecting the X-rays and neutrons at the at least one particle detector following passage through the unit of nuclear waste comprises providing a separate measurement of each of the X-rays and the neutrons.

15. The method of claim 7 further comprising repeating the steps of generating a laser beam pulse, directing the laser beam pulse, and detecting the X-rays and neutrons, at a rate of at least 1 Hz, and moving the unit of nuclear waste to different positions relative to the target structure between at least some of the repetitions.

16. The method of claim 15 wherein generating a separate image of the unit from each of the detected X-rays and neutrons comprises generating multiple images of at least part of the unit of nuclear waste from corresponding multiple positions of the unit of nuclear waste relative to the target structure, and further comprising carrying out a tomographic reconstruction of at least part of the unit of nuclear waste using the multiple images.

17. The method of claim 7 further comprising detecting spectral properties of the X-rays and/or neutrons, and determining properties of the unit of nuclear waste from the spectral properties.

18. Apparatus for inspecting a unit of nuclear waste comprising:
a laser system arranged to generate a laser beam pulse;
a pitcher-catcher target structure arranged to receive the laser beam pulse and to thereby emit X-rays and neutrons; and
one or more detectors arranged to detect the X-rays and neutrons arising from the laser beam pulse following passage through a unit of nuclear waste;
wherein the apparatus is arranged to generate a separate transmission image of the unit of nuclear waste using each of the detected X-rays and neutrons arising from the laser beam pulse.

19. The apparatus of claim 18, wherein the pitcher-catcher target structure contains an X-ray emitting target arranged to generate X-rays with a source diameter of less than 200 µm.

20. The apparatus of claim 19 wherein the pitcher-catcher target structure contains a neutron emitting target arranged to generate neutrons in response to particles emitted by the X-ray emitting target.

21. The apparatus of claim 18 arranged to repeat the generation of the laser beam pulse, the emission and detection of the X-rays and neutrons, and the generation of the transmission images, so as to generate multiple transmission images, and to move the drum between the repetitions,
the apparatus further comprising an analyser arranged to generate a tomographic reconstruction of the interior of the unit of nuclear waste from multiple ones of the transmission images.

22. The apparatus of claim 18 further comprising the unit of nuclear waste.

23. The apparatus of claim 18 further comprising a transport mechanism arranged to automatically deliver a series of units of nuclear waste for automatic inspection by the apparatus.

* * * * *